(No Model.)

W. H. HAWORTH.
ORDER PAD CALENDAR.

No. 444,150.  Patented Jan. 6, 1891.

WITNESSES:
C. Stons
C. P. Swett

INVENTOR
William H. Haworth
BY
Chas. D. Swett
ATTORNEY.

THE NORRIS PETERS CO., PHOTO-LITHO., WASHINGTON, D. C.

United States Patent Office.

WILLIAM H. HAWORTH, OF BROOKLYN, NEW YORK.

ORDER-PAD CALENDAR.

SPECIFICATION forming part of Letters Patent No. 444,150, dated January 6, 1891.

Application filed August 23, 1890. Serial No. 362,793. (No model.)

*To all whom it may concern:*

Be it known that I, WILLIAM H. HAWORTH, a citizen of the United States, residing at Brooklyn, in the county of Kings and State of New York, have invented certain new and useful Improvements in Order-Pad Calendars; and I do declare the following to be a full, clear, and exact description of the invention, such as will enable others skilled in the art to which it appertains to make and use the same, reference being had to the accompanying drawing, and to the letters of reference marked thereon, which form a part of this specification.
My invention relates to calendars used in connection with other means for expediting the ordering and shipping of goods.

The invention accomplishes five different purposes, as follows: First, it simplifies and expedites the preparation of orders for shipping; second, it preserves a record of the orders thus made; third, it prevents errors as to dates and routes; fourth, it binds the shipper as to dates and routes, and, fifth, it binds the carrying company as to dates of receiving and delivering the goods. These objects are secured by the combination of a calendar bearing reference date-marks, permanent record-blanks, and detachable order-blanks, all connected together to form a convenient article for the desk or for hanging near it. The record-blanks in some cases are omitted.

The accompanying drawing illustrates the invention in its fullest form, the various parts of the invention being referred to by letter.

The letter A indicates the back or support, and is usually made of pasteboard; but wood, metal, or any suitable material may be used, and there is no limit as to size. Such portions of the front side of this support as are not covered by the calendar and blanks mentioned above may be occupied with pictures of sailing vessels, depots, trains of cars, and with advertisements of the advantages of shipping by the particular route controlled by the company in whose interests these order-pad calendars are issued, and also for advertising any other desired matter. The back A is adapted to be laid flat upon the desk, and is also provided with an eyelet $a$ or other means for hanging it up.

Upon the front of the support A, and preferably near its top, I attach a calendar B in a single yearly sheet or in monthly, weekly, or daily sheets, and having certain days $b\ b$ marked by some design or by a change of color, or both. In the drawing certain days, as Monday, Wednesday, Friday, and Saturday of each week, are marked with a flag, which should properly be of the color blue and having a central square white. Such a flag is called a "blue peter," and vessels fly this flag on their foremast on their sailing-day only.

Upon another part of the support A, and preferably near its bottom, is attached a pad or block of sheets printed for record or memorandum blanks C and for order-blanks D, these blanks being separated by the perforated line $c$. The record-blanks C are fixed permanently to the back A and form a memorandum-stub, which may be printed with matter shown in drawing or otherwise, as preferred. The order-blanks D, detachable from the stub C by means of the perforations $c$, are printed, as shown in drawing or otherwise, as preferred, according to the uses to which they are applied; but they must contain a reference to the company's calendar connected therewith and to a marked date thereon. These order-blanks D may be attached directly to the support A and be used without a memorandum-stub, if so desired; and the calendar may be a plain calendar without distinguishing-marks on certain dates, in which form the invention is an effective advertising medium, besides affording the convenience of the combination of the order-pad and calendar.

The advantages of my invention are evident at a glance. The calendar indicates the day for the departure of the vessel as officially announced by the company. The order-blank is filled out and the sailing-day named on which the goods are to be shipped, reference being made to the company's schedule. The memorandum-blank is filled out to tally with the order, and the latter is detached and forwarded to the consignor, who is thus charged plainly with his duty in the case and is without excuse for shipping by any other line. Likewise the carrying company on receiving from the consignor the goods and the shipping-order are made liable unless they promptly carry out the instructions there given.

I am aware that the use of designating-marks on certain dates of a calendar for various purposes is not new, and I do not broadly claim such to be my invention.

Having described my invention, what I claim, and desire to secure by Letters Patent, is—

1. An order-pad calendar formed of a supporting-back A, having a calendar B attached thereto, certain days b b of said calendar bearing a representation of a blue peter thereon, and having an order-pad the sheets of which are divided by a perforated line c, the part C being fixed to the back A and the part D being detachable, both of the said parts C and D having date-spaces to be filled with a date to correspond with some particular date marked on the said calendar by the blue peter, and other spaces to be filled with orders and a record thereof, as herein described.

2. In an order-pad calendar, the combination of a calendar, certain days of which are marked with an appropriate design, as a blue peter, and detachable order-blanks, each provided with a blank date-space to be filled with a date corresponding to some marked date on the said calendar, for the purposes herein described.

In testimony whereof I affix my signature in presence of two witnesses.

WILLIAM H. HAWORTH.

Witnesses:
GEORGE H. YAHN,
CHAS. S. CLEVELAND.